United States Patent
Rosen et al.

(10) Patent No.: US 7,470,412 B2
(45) Date of Patent: Dec. 30, 2008

(54) REDUCTION OF CO AND NOX IN REGENERATOR FLUE GAS

(75) Inventors: Lee Rosen, Buffalo, NY (US); Kuang Tsai Wu, Williamsville, NY (US); Mushtaq M. Ahmed, Pittsford, NY (US)

(73) Assignee: Praxair Technology, Inc., Danbury, CT (US)

( * ) Notice: Subject to any disclaimer, the term of this patent is extended or adjusted under 35 U.S.C. 154(b) by 310 days.

(21) Appl. No.: 11/312,596

(22) Filed: Dec. 21, 2005

(65) Prior Publication Data
US 2007/0140942 A1    Jun. 21, 2007

(51) Int. Cl.
  *B01D 53/54* (2006.01)
  *B01D 53/56* (2006.01)
  *B01D 53/58* (2006.01)
  *B01D 53/62* (2006.01)

(52) U.S. Cl. ............... 423/235; 423/236; 423/237; 423/246

(58) Field of Classification Search ......... 423/235, 423/236, 237, 246
See application file for complete search history.

(56) References Cited

U.S. PATENT DOCUMENTS

| 4,519,993 | A |   | 5/1985  | McGill et al. |
| 4,812,430 | A | * | 3/1989  | Child ............ 502/42 |
| 5,240,690 | A |   | 8/1993  | Tang et al. |
| 5,266,024 | A |   | 11/1993 | Anderson |
| 5,372,706 | A |   | 12/1994 | Buchanan et al. |
| 5,716,514 | A |   | 2/1998  | Buchanan |
| 5,830,346 | A |   | 11/1998 | Harandi et al. |

* cited by examiner

*Primary Examiner*—Timothy C Vanoy
(74) *Attorney, Agent, or Firm*—Donald T. Black

(57) ABSTRACT

A hot oxygen stream is fed into a catalyst regenerator flue gas stream that contains carbon monoxide to remove carbon monoxide. NOx precursors such as $NH_3$ and HCN are converted into $N_2$ and if NOx is present in the flue gas stream the addition of the hot oxygen stream lowers the amount of NOx present.

46 Claims, 3 Drawing Sheets

REDUCTION OF CO AND NOX IN REGENERATOR FLUE GAS

FIELD OF THE INVENTION

This invention relates to treatment of flue gases from catalyst regeneration units.

BACKGROUND OF THE INVENTION

Fluid catalytic cracking (FCC) is a unit operation in which petroleum fractions of higher molecular weight are cracked into smaller molecules under heat and with a catalyst. During the cracking process, coke deposits form on the surface of the catalyst, necessitating regeneration of the catalyst. Therefore, the catalyst is continuously separated from the vapors generated by the cracking process and regenerated in a FCC regenerator where the coke deposits are burned off and the catalyst activity is restored.

The FCC regenerator can operate in two modes: full burn and partial burn. In the full burn mode, most of the carbon in the coke deposits is converted to $CO_2$ by reacting with oxygen in the oxidant stream that is also fed to the regenerator. When the regenerator is operated in the partial burn mode, the carbon reacts with oxygen in the oxidant stream and is converted to both CO and $CO_2$. In this instance, the CO in the regenerator flue gas is typically oxidized to $CO_2$ in a downstream boiler to recover heat from the CO oxidation and also to limit emissions of CO in the boiler flue gas. The CO boiler has air fired burners to create a hot flame zone that the regenerator flue gas has to pass through in which the CO is oxidized to $CO_2$. Refinery off-gas can be used as auxiliary fuel for the CO boiler burners. The heat released by the oxidation of CO and from the combustion of the refinery gas is recovered in the boiler to produce process steam. The FCC regenerator flue gas also contains other trace species such as $SO_2$, NOx, and species of reduced nitrogen such as $NH_3$ and HCN. Typically, most of the nitrogen in the carbon deposits is oxidized to NOx in the full burn mode. In the partial burn mode, some of the nitrogen is also transformed to $NH_3$ and HCN, and some of the $NH_3$ and HCN is oxidized to NOx in the downstream CO boiler. The amount of NOx plus the amount of other reduced nitrogen species such as HCN, $NH_3$, CN, HNO is conveniently called "total fixed nitrogen" (or "TFN") hereafter.

The most common mode of regenerator operation currently in use is the full burn mode. Recently, interest has been renewed in the partial burn mode because of the refiner's desire to maximize FCC production capacity, but there are technical limits in terms of how much feed one can push through a FCC unit in a given time. For example, when the feed rate to a FCC is increased the FCC regenerator flue gas will contain more CO if the FCC is already operating at maximum air blower limitations. This increased CO in the FCC regenerator flue gas must be burned in the downstream CO boiler to meet environmental regulations. For some boilers this may present a problem because the boiler may not be able to destroy the increased CO down to the ppm (parts per million) levels required for compliance with environmental regulations. Thus, the capability of the boiler to destroy CO becomes a bottleneck for any upstream FCC capacity improvement measures.

The total firing rate of the CO boiler burners is largely dictated by the need to provide a flame temperature high enough for sufficient burnout of CO in the FCC regenerator flue gas. Typically flame temperatures of about 1800 F are recommended although the auto ignition temperature of the CO gas is much lower (about 1450 F). For a given regenerator flue gas composition, there is a minimum boiler firing rate below which the amount of thermal destruction of CO that is achieved is not satisfactory. In many occasions, this minimum boiler firing rate produces excess process steam which is ultimately vented to the ambient atmosphere without any use. This represents a waste of fuel energy.

Some FCC systems have low temperature NOx and/or NOx / SOx removal devices downstream of the CO boiler. The low temperature NOx removal process normally requires a specified amount of gas residence time for achieving the desired NOx reduction efficiency. Another problem associated with the FCC capacity increase is that the volume of the FCC regenerator flue gas may also increase. The increase of the regenerator flue gas volume shortens the gas residence time available for the downstream NOx removal devices and reduces their NOx reduction efficiency. The increase in the regenerator flue gas volume also promotes carryover of corrosive scrubbing fluid and increases the risk of accelerated corrosion after the scrubber.

Other processes that treat FCC regenerator flue gas differ from the present invention, but differ in significant conditions and do not provide the advantages that the present invention achieves. For instance, U.S. Pat. No. 5,240,690 teaches adding oxygen-containing gas to regenerator flue gas to produce an off gas having a temperature between 1000 F and 1600 F, but states that the objective is to increase the formation of NOx in the flue gas. U.S. Pat. No. 5,716,514 discloses a method in which carbon monoxide is preferentially not converted to carbon dioxide. U.S. Pat. No. 5,830,346 discloses a method that requires use of a catalyst for the conversion.

BRIEF SUMMARY OF THE INVENTION

In one embodiment of the invention, a method for treating a regenerator flue gas stream comprises (A) providing from a catalyst regenerator a regenerator flue gas stream that contains NOx and carbon monoxide;

(B) mixing fuel and oxygen and combusting a portion of the oxygen in the mixture with said fuel to form a hot oxidant stream that has a temperature of at least 2000 F and that contains oxygen and products of said combustion;

(C) feeding the hot oxidant stream into the regenerator flue gas stream to form a mixture having a temperature higher than 1250 F sufficient to convert carbon monoxide in the mixture to carbon dioxide and to convert NOx in the mixture to $N_2$ so that the amount of NOx in the mixture following said conversion is less than the amount of NOx in said regenerator flue gas stream before said mixture is formed.

In another embodiment of the invention, a method for treating a regenerator flue gas stream comprises (A) providing from a catalyst regenerator a regenerator flue gas stream that contains no NOx and contains carbon monoxide and one or both of $NH_3$ and HCN;

(B) mixing fuel and oxygen and combusting a portion of the oxygen in the mixture with said fuel to form a hot oxidant stream that has a temperature of at least 2000 F and that contains oxygen and products of said combustion;

(C) feeding the hot oxidant stream into the regenerator flue gas stream to form a mixture having a temperature higher than 1250 F sufficient to convert carbon monoxide in the mixture to carbon dioxide and to convert one or both of $NH_3$ and HCN in the mixture to $N_2$.

Preferably, when the mixture is formed in step (C) catalyst is not added that would promote the conversion of the carbon monoxide or of the NOx.

As used herein, the term "NOx" means compounds of nitrogen and oxygen, and mixtures thereof, including but not limited to NO, $N_2O$, $NO_2$, $N_2O_4$, and mixtures thereof.

DETAILED DESCRIPTION OF THE INVENTION

While the following description of the present invention refers to the Figures, the invention is not to be considered to be confined to the embodiments illustrated in the Figures.

Figure 1:
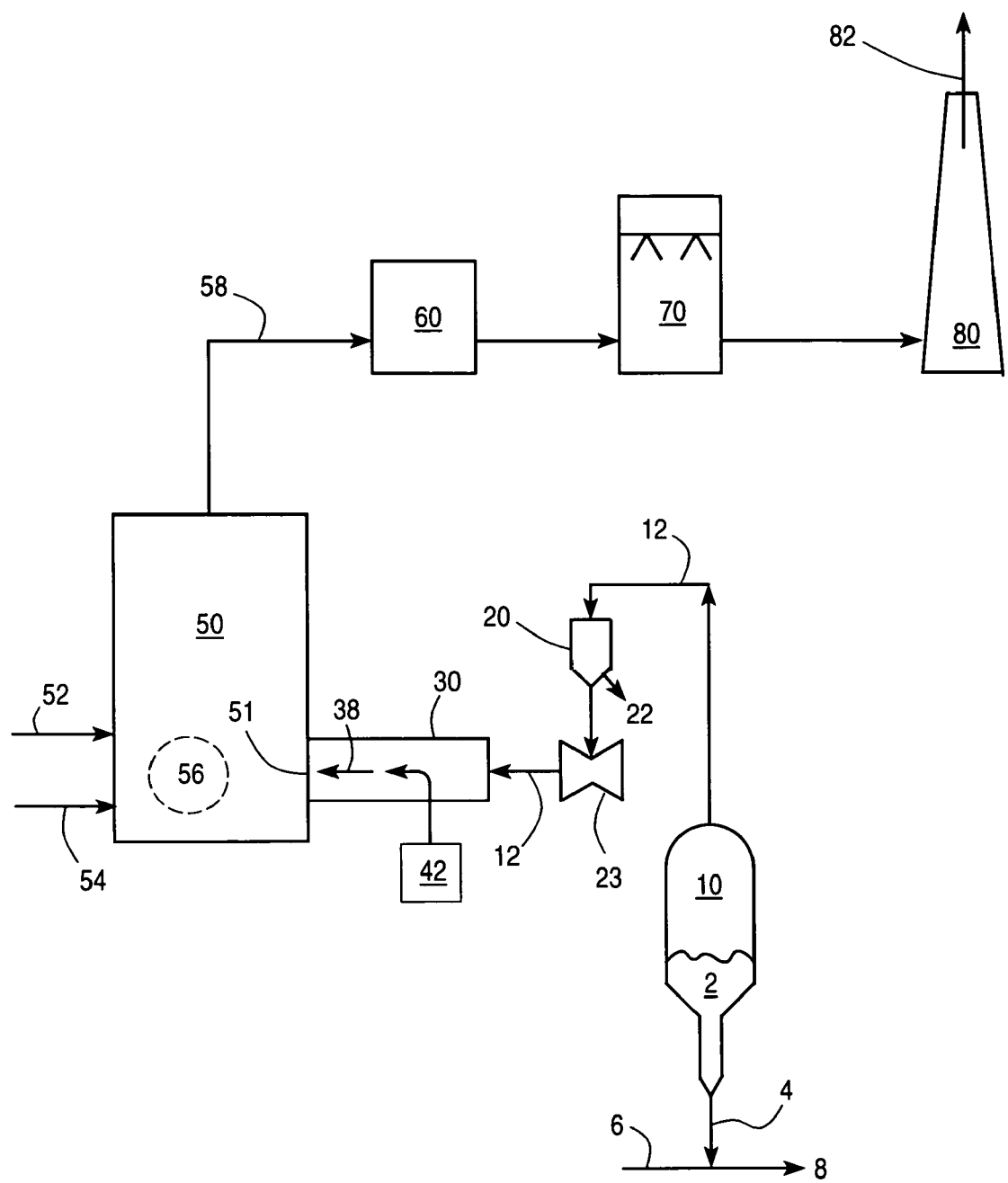
FIG. 1 is a flowsheet showing one embodiment of the present invention.

Referring to FIG. 1, a FCC regenerator (10) receives and regenerates used catalyst (2) from a FCC unit (not shown) and the regenerated catalyst (4) is mixed with a FCC feed stream (6) to form stream (8) which is transported back to the FCC unit. The regenerator flue gas stream (12) preferably passes through a device to remove entrained catalyst from the flue gas. One such device is cyclone separator (20), wherein fine catalyst carried over by the flue gas stream is separated and discharged through a conduit (22). The regenerator flue gas stream (12) optionally but preferably goes through a power recovery turbine (23) to convert kinetic energy of the regenerator flue gas to readily usable power. After passing through the power recovery turbine, the regenerator flue gas stream (12) flows into and through a regenerator flue gas duct (30) or chamber, from which the flue gas (12) can pass into a downstream CO boiler (50).

If the FCC regenerator (10) is operated in the partial burn mode, the regenerator flue gas stream (12) entering the duct (30) may contain NOx, 1% to 8% CO, and hundreds or thousands of ppm of NOx precursors such as $NH_3$ and HCN. If the FCC regenerator (10) is operated in the partial burn mode at a sufficiently fuel rich condition, the regenerator flue gas stream (12) entering the duct (30) may contain no NOx, 1% to 8% CO, and hundreds or thousands of ppm of one or both of the NOx precursors $NH_3$ and HCN. If the FCC regenerator (10) is operated in the full burn mode, the regenerator flue gas stream (12) may contain NOx, up to 1% CO, and hundreds of ppm of NOx precursors. That is, the regenerator flue gas stream will contain NOx, or it will contain no NOx but will contain one or both of $NH_3$ and HCN, or it will contain NOx together with one or both of $NH_3$ and HCN.

In any of these modes, the regenerator flue gas stream entering duct (30) has a temperature in the range of 1100 F to 1400 F.

In the regenerator flue gas duct (30), or in any suitable chamber instead of a duct, a stream (32) of gaseous hot oxidant is fed at high momentum into the regenerator flue gas. The hot oxidant and the regenerator flue gas mix, during which the hot oxygen burns CO in the regenerator flue gas to $CO_2$ and converts at least some NOx (if present) and NOx precursors $NH_3$ (if present) and HCN (if present) to environmentally benign $N_2$. The resulting gas mixture as stream (38) comprises the products of these reactions between the hot oxidant and the FCC regenerator flue gas and is available for further exploitation or for venting to the atmosphere.

In a preferred manner of exploiting stream (38), it is fed to the CO boiler (50) through an inlet gate (51). In the CO boiler (50), combustion air (52) and auxiliary fuel (54) are supplied to the boiler burners and a flame zone (56) is created. The remaining or un-reacted CO in stream (38) is burned to $CO_2$ when the stream passes through the flame zone. The total boiler flue gas stream (58), after heat recovery within the CO boiler to make steam, exits the boiler and flows to a low temperature de-NOx unit (60). The boiler flue gas then passes through a wet scrubber (70) for emissions control and finally, the cleaned boiler flue gas is sent to a stack (80) and emitted to the atmosphere (82). In another possible embodiment, the heat generated in the combustion of the gas is recovered by heat exchange to another chemical process stream, rather than to boiler feedwater to form steam.

Other ways in which all or a portion of stream (38) can be exploited include using it as a feed stream for chemical process reactions, and passing it through a heat exchanger in which its heat is transferred to another process stream.

Figure 5:
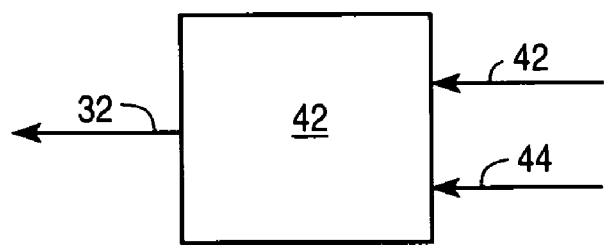
FIG. 5 is a schematic representation of a hot oxygen generator useful in the present invention.

To provide the high momentum hot oxygen stream (32), with reference to FIG. 5, stream (40) of oxidant having an oxygen concentration of at least 30 volume percent and preferably at least 85 volume percent is provided into a hot oxygen generator (42) which is preferably a chamber or duct which communicates with the regenerator flue gas duct or chamber through a suitable opening. Most preferably the oxidant is technically pure oxygen having an oxygen concentration of 99.5 volume percent or more. The oxidant fed to the hot oxygen generator has an initial velocity which is generally within the range of from 50 to 300 feet per second (fps) and typically will be less than 200 fps.

Stream (44) of fuel is provided to the oxidant in the hot oxygen generator (42) through a suitable fuel nozzle which may be any suitable nozzle generally used for fuel injection. The fuel may be any suitable combustible fluid examples of which include natural gas, methane, propane, hydrogen and coke oven gas. Preferably the fuel is a gaseous fuel. Liquid fuels such as number 2 fuel oil may also be used, although it would be harder to maintain good mixing and reliable and safe combustion with the oxidant with a liquid fuel than with a gaseous fuel.

The fuel provided into the hot oxygen generator (42) combusts there with oxidant to produce heat and combustion reaction products such as carbon dioxide and water vapor. Preferably, no more than about 20 percent of the oxygen of the oxidant combusts with the fuel, or else insufficient hot oxygen may be provided to the regenerator flue gas. In addition, if more than about 20 percent of the oxygen combusts with the fuel in the hot oxygen generator, then the temperature of the remaining oxygen may increase to undesirable levels.

The combustion reaction products generated in the hot oxygen generator (42) mix with the remaining oxygen of the oxidant, thus providing heat to the remaining oxygen and raising its temperature. Preferably, the fuel is provided into the hot oxygen generator (42) at a high velocity, typically greater than 200 fps and generally within the range of from 500 to 1500 fps. The high velocity serves to entrain oxidant into the combustion reaction thus establishing a stable flame. The high velocity enables further entraining of combustion reaction products and oxidant into the combustion reaction, this improving the mixing of the hot combustion reaction products with the remaining oxygen within the hot oxygen generator and thus more efficiently heating the remaining oxygen.

Generally the temperature of remaining oxidant within the oxidant supply duct is raised by at least about 500 F, and preferably by at least about 1000 F. It is preferred however that the temperature of the remaining oxidant not exceed about 3000 F because above that temperature, dissociation of combustion reaction products increases markedly, causing overheating problems with supply ducts and nozzles.

As the temperature of the remaining oxygen within the hot oxygen generator (42) is increased, the requisite supply pressure of the oxidant to achieve any given oxidant injection velocity into the regenerator flue gas decreases. When the oxygen is at ambient temperature the requisite pressure exceeds 7 pounds per square inch gauge (psig) in order to inject the oxygen into the regenerator flue gas at a velocity of 800 fps. As the oxygen temperature increases, the requisite pressure decreases sharply. At a temperature of 1500 F the requisite pressure is 1.65 psig and at a temperature of 3000 F. the requisite pressure is only 0.91 psig. At temperatures exceeding 3000 F. there is little additional benefit, thus providing another reason for not exceeding 20 percent oxygen combustion with the fuel. Thus, generation of hot oxygen in this manner can provide a high velocity hot oxidant stream (42) to the regenerator flue gas without the need for a high supply pressure thus reducing or eliminating the need for compressing oxidant prior to passing it into the regenerator flue gas which would otherwise be necessary if the oxidant source pressure is not high.

The hot oxygen stream (42) obtained in this way is passed from the hot oxygen generator into the regenerator flue gas through a suitable opening or lance as a high velocity hot oxygen stream having a temperature of at least 2000 F. Generally the velocity of the hot oxygen stream will be at least 500 feet per second (fps), such as within the range of from 500 to 3000 feet per second (fps), preferably 500 to 2000 or to 2500 fps, and will exceed the initial velocity by at least 300 fps.

The composition of the hot oxygen stream depends on the conditions under which the stream is generated, but preferably it contains at least 75% (volume) $O_2$. A typical composition for this stream is about 80% $O_2$, 12% $H_2O$, 6% $CO_2$, and some highly reactive radicals such as OH, O, and H. These reactive radicals are particularly effective to initiate and oxidize CO to $CO_2$. The hot oxygen gas stream exits the nozzle or lance and is fed to the regenerator flue gas at high velocity and momentum, which results in accelerated mixing between the hot gas and the FCC regenerator flue gas.

The formation of the high momentum hot oxygen stream can be carried out in accordance with the description in U.S. Pat. No. 5,266,024, the content of which is hereby incorporated herein by reference.

The high velocity hot oxygen stream is believed to entrain the FCC regenerator flue gas (12) through jet boundaries by velocity gradients or shear stress. The resulting mixture of the regenerator flue gas and the hot oxygen stream has a temperature of at least 1250 F, and preferably at least 1400 F, although advantages can be realized when the temperature of this mixture is above 1600 F.

Figure 2:
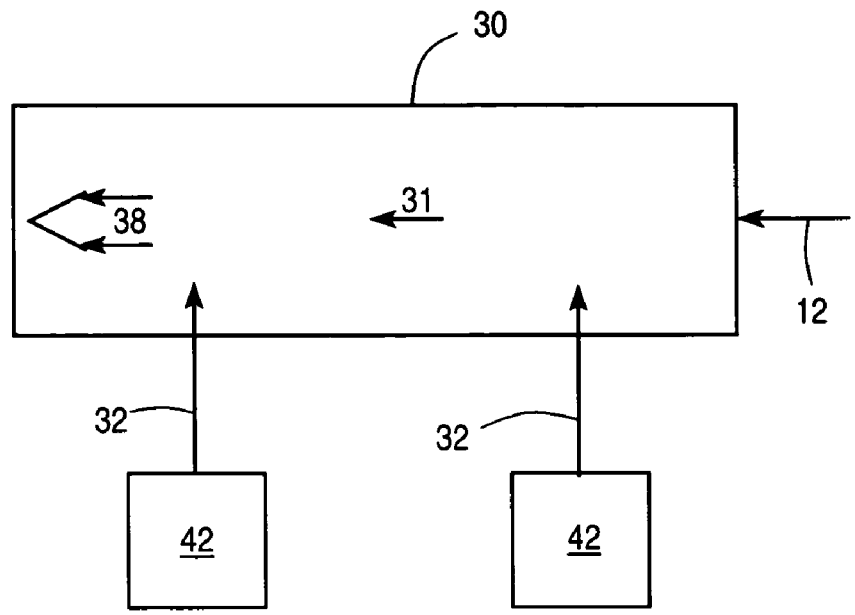
FIG. 2 is a flowsheet of a portion of an alternate embodiment of the present invention.

In other embodiments of the invention, two or more high momentum hot oxidant streams are fed into the regenerator flue gas stream. FIG. 2 illustrates one such embodiment. In FIG. 2, FCC regenerator flue gas stream (12) enters duct (30) where it mixes with a high momentum hot oxidant stream (32) formed and fed as described above with respect to stream (32) in FIG. 1. Part of the CO and TFN contained in the regenerator flue gas stream (12) are destroyed during this mixing, forming reacted mixture stream (31) into which a second high momentum hot oxidant stream (32b) (also formed and fed as described above with respect to stream (32)) is fed and mixes. The second stream (32b) mixes with the reacted mixture stream (31) and further reduces the amount of CO, NOx and NOx precursors in stream (31). The resulting mixture stream (38) can be fed to a CO boiler inlet gate (51) or, as described above, can be exploited in other ways.

In this embodiment, the conversion of CO in the regenerator flue gas to $CO_2$ will occur under sub-stoichiometric conditions in multiple stages because the hot oxygen is supplied not all at once. Under this configuration, the TFN destruction reactions occur in longer residence times under these fuel rich conditions because of the staged burnout of the CO. Therefore, higher destruction efficiencies of NOx precursors or TFN are expected.

Figure 3:
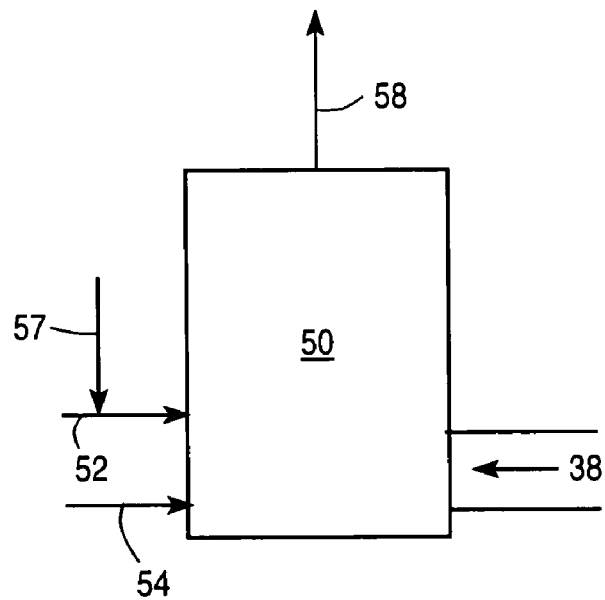
FIG. 3 is a flowsheet of a portion of another embodiment of the present invention.

Another embodiment of the present invention is to add oxygen to enhance combustion within the combustion chamber of the CO boiler. This embodiment is illustrated in FIG. 3, in which reference numerals appearing in FIGS. 3 and 1 have the meanings given in FIG. 1. In this embodiment, stream (57) of oxygen can be fed into stream (52) of combustion air, or oxygen can be fed directly into the combustion chamber such as with a suitable lance (53), or oxygen can be added both as streams (57) and through lances (53). Another practice is to change some or all air-fired burners of the boiler to oxy-fuel fired burners (not shown in FIG. 3). The oxygen added in any of these ways should be as a stream containing more than 21 vol. % $O_2$, and more preferably more than 90 vol, % $O_2$.

For units that are long on steam, the use of the oxygen will result in reduced boiler flue gas flow at a baseline boiler flame temperature. Since reducing the flue gas flow decreases sensible heat loss carried by the boiler flue, the CO boiler's firing rate can be reduced while the flame temperature is kept constant. The reduction of the boiler flue gas flow and firing rate will lead to increased flue gas residence time available for downstream NOx removal devices for higher NOx destruction efficiency.

Conversely, for units that are short in steam the use of the oxygen allows the CO boiler to process more regenerator flue gas and generate more steam at the same baseline fuel firing rate. In this case the total flue gas volume from the boiler can be kept at about the same level as the baseline, even though the CO boiler processes more FCC regenerator flue gas. Therefore the CO boiler's capacity in terms of processing the FCC regenerator flue gas flow is increased with the use of the oxygen. For example, mass and energy balance calculations have shown that if the air is enriched to have 23.5 mole % $O_2$, the capacity of the CO boiler could be increased by 7%. When the CO boiler is converted to oxy-fuel firing, its capacity could be increased by 30%. If this ability to increase CO boiler capacity is transferred to the upstream FCC unit and the regenerator, the CO boiler would no longer be a bottleneck for the upstream FCC unit's capacity improvement measures, and the economic benefits to the refinery operator can be substantial.

Figure 4:
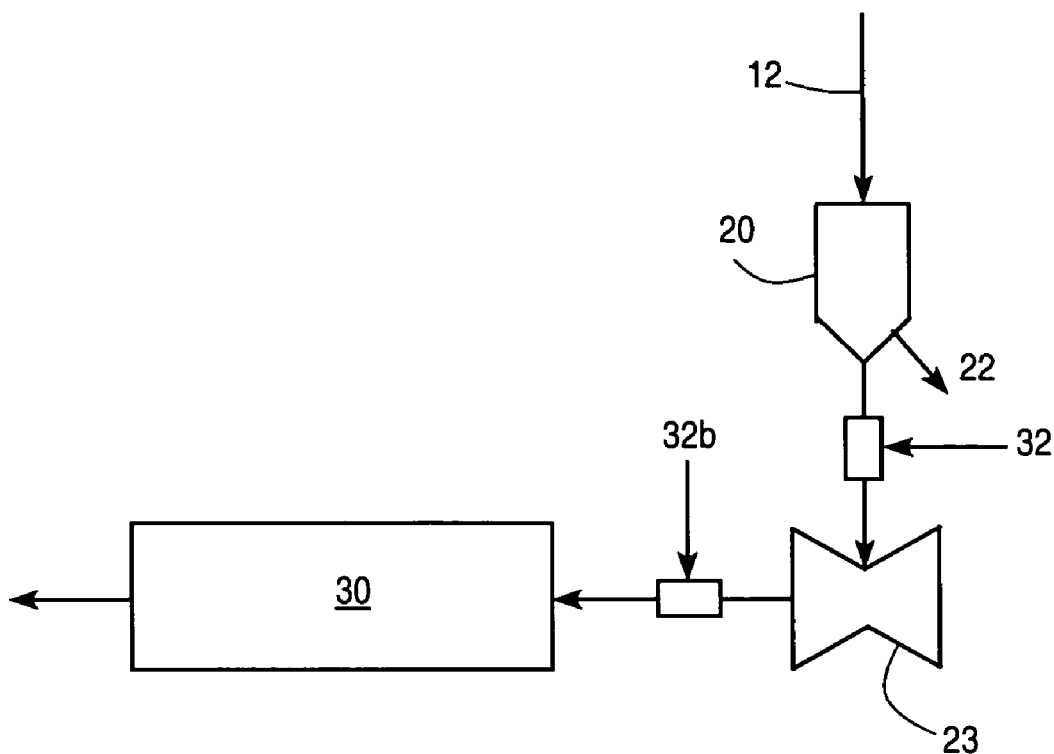
FIG. 4 is a flowsheet of yet another embodiment of the present invention.

FIG. 4 shows yet another embodiment of this invention. In FIG. 4, high momentum hot oxidant stream (32) is fed into the regenerator flue gas stream after cyclone separator (20) and upstream from power recovery turbine (23). In this embodiment, the heat provided by the hot oxygen and the heat released by the CO burnout can increase the regenerator flue gas temperature by 225 F to 520 F, before the gas stream enters the power recovery turbine (23). The feeding of the hot oxygen stream (32) for CO burnout also increases the total regenerator flue gas mass flow by about 0.6% to 2%. The increased mass flow and gas temperature would increase the output of the power recovery turbine due to the increase of the gas stream's momentum entering the turbine. The amount of the hot oxygen flow and the extent of the CO burnout can be controlled to meet the turbine's temperature limits.

Other combinations of configurations exist. For example, an optional second high momentum stream of hot oxidant (32b) could be fed after the turbine (23). In this case, the burnout of the CO is staged; thus the destruction efficiency of the TFN or NOx precursors is expected to be higher.

This invention is expected to have the following unique and unobvious advantages:

Operational limits on the CO boiler are eased or removed. That is, the upstream FCC unit may operate at deeper (i.e. more fuel-rich) partial burn mode for capacity increase, i.e., the feed rate to the FCC is increased while the air flow rate is kept at an allowable maximum. Under this operating condition, the FCC regenerator flue gas will contain more CO and TFN species. However, this FCC regenerator flue gas will mix rapidly with the injected high-momentum hot oxygen for both CO burnout and TFN destruction. The amount of the hot oxygen injected can be tailored so that any remaining CO and TFN in the regenerator flue gas can be destroyed properly in the downstream CO boiler. In essence, this invention removes limitations imposed by the CO boiler in handling regenerator flue gas containing high concentrations of CO and TFN. Thus, the invention allows existing FCC units to operate at higher capacities with little capital investment.

The fuel consumption in the CO boiler is reduced, and incidence of excess steam production occurs less often. That is, the temperature of the FCC regenerator flue gas, normally in the 1250 F to 1350 F range at the FCC unit exit, may not be high enough for sustained CO burnout. The hot oxygen fed into the regenerator flue gas provides necessary oxygen for CO burnout and supplies additional heat to raise the temperature of the regenerator flue gas. The combination of these two factors allows the CO in the regenerator flue to be oxidized to $CO_2$ and releases heat, which increases the temperature of the FCC regenerator flue entering the CO boiler. Therefore, the auxiliary fuel flow to the CO boiler can be reduced to maintain a target boiler flame temperature. The reduction of the boiler fuel flow also reduces the boiler's steam production rate. In situations where there is excess steam which must be vented, the reductions both in boiler fuel flow and in venting of steam present economic advantages for the refinery operators.

Flue gas volume is reduced, and flue gas residence time is increased. Reduction of auxiliary boiler fuel flow, as described in the previous paragraph, also reduces the flue gas volume of the CO boiler. This volume reduction translates to longer gas residence times available for any downstream de-NOx processes to achieve higher NOx destruction efficiency. The reduction of the flue gas volume also lowers gas velocity in any wet scrubbers downstream of the CO boiler, thus reducing the risk of severe corrosion induced by carryover of corrosive scrubbing fluids.

The CO boiler can be eliminated where it is not otherwise needed for steam generation, and associated pollution control equipment can be reduced in size. That is, if sufficient hot oxygen is fed into the FCC regenerator flue gas to burn out all the contained CO and to reduce the TFN present to nitrogen gas, then if steam is not otherwise needed it would not be necessary to install a downstream CO boiler. In this case, the hot FCC regenerator flue gas could go directly through a heat recovery device, such as one or more heat exchangers, for energy recovery. Because auxiliary boiler fuel and combustion air for the CO boiler would also no longer be needed, the volume of flue gas entering the low temperature de-NOx devices and the downstream scrubbers is much less. This will reduce the sizes of all downstream pollution control devices.

The feed rate of the hot oxidant may be optimized for maximum TFN destruction. When a FCC unit is operated at a more fuel-rich partial burn mode, the FCC regenerator flue gas contains fixed nitrogen species. Two major components of the fixed nitrogen species are $NH_3$ and HCN. Computational simulations of this invention found that the destruction of HCN favors gaseous environments at higher temperatures under sub-stoichiometric or near stoichiometric combustion conditions. Hence the feed rate of the hot oxygen may be tailored for maximum TFN destruction depending on the composition of the FCC regenerator flue gas. For example, if a regenerator flue gas contains mostly HCN and little $NH_3$, then more hot oxygen would be injected for CO burnout to produce higher gas temperature which in turn promotes the destruction of HCN to $N_2$.

The injection of the hot oxygen can have synergistic effect in boosting the output of a power recovery turbine. That is, when a high momentum, hot oxidant stream is fed into the regenerator flue gas stream upstream of the power recovery turbine, the heat provided by the hot oxygen and the heat released by the CO burnout can increase the regenerator flue gas temperature. The injection of the hot oxygen for CO burnout also increases the total regenerator flue gas mass flow. The increased mass flow and gas temperature would increase the output of the power recovery turbine due to the increase of the gas stream's momentum entering the turbine.

Also, consumption of CO combustion promoters in the regenerator is reduced or eliminated. That is, many FCC regenerators use platinum-based CO combustion promoters to accelerate CO burnout for controlling CO afterburn. It has been reported that the use of the platinum-based combustion promoters increases NOx concentration in the regenerator flue gas. Hence, the amount of CO reduction must be balanced with the maximum amount of NOx allowed, through the amount of combustion promoters used in the regenerator bed. The combustion promoters may not be reclaimed entirely so there are economic losses associated with the loss of the expensive combustion promoters. If a high momentum hot oxygen stream is fed into the regenerator flue gas stream as described herein, the amount of these combustion promoters in use may be reduced. This is because the hot oxygen can destroy the CO in the downstream regenerator flue gas. The reduced consumption of combustion promoters will in turn decrease the amount of unrecoverable promoters thus reducing the operating costs of a FCC unit.

The invention is further illustrated in the following predictive, computationally simulated examples.

EXAMPLE 1

The following example illustrates the thermal and process aspects of this invention in detail by using computer models of mass and energy balances. Four modeling cases are defined and the calculated results and operational characteristics of the CO boiler are summarized in Table 1.

Case A. Baseline actual CO boiler operation with 1.51% CO in the regenerator flue gas.

Case B. CO concentration in the regenerator flue gas increased to 3.64% and 500 ppm of $NH_3$ and 500 ppm of HCN are assumed to be in the flue gas; operation with hot oxygen fed into the regenerator flue gas, some CO burned with the hot oxygen.

Case C. Same as Case B, but more oxygen is injected to the regenerator flue gas for more CO burnout in the flue gas Case D. Same as Case B, but amount of the hot oxygen fed is increased to 105% of the theoretical oxygen required to burn all of the CO in the regenerator flue gas. Air burners are eliminated from the CO boiler, which is used as heat recovery device but without combustion going on inside it.

In Case A, 465,000 lb/hr of FCC regenerator flue gas containing 1.51% of CO at 1250 F was fed to a CO boiler. The total heat input carried by the regenerator flue gas was 28.7 MMBtu/hr. This regenerator flue gas was fed to a CO boiler to which 164.8 MMBtu/hr of refinery gas and 790 $ft^3$/sec of air were also fed. Therefore, the total thermal input to the CO boiler was 193.5 MMBtu/hr. The calculated boiler flame temperature was 1771 F and the excess oxygen to the stack was 3%. The boiler generated 180,000 lb/hr of steam and the total mass flow of the flue gases exiting the CO boiler was 687,136 lb/hr.

In Case B, the CO content in the FCC regenerator flue gas was increased to 3.64% to reflect that the upstream FCC unit was operated at richer partial burn conditions. The flow rate and temperature of the incoming regenerator flue gas were assumed to be unchanged, for simplicity. The thermal input of the FCC regenerator flue gas was higher at 69.9 MMBtu/hr because of the higher inlet CO concentration. A high momentum hot oxygen stream, at a temperature of 2446 F, obtained by reacting 1.9 MMBtu/hr of natural gas and 31 ton/day of oxygen and containing 82% of $O_2$, 11.5% of $H_2O$, 5.5% of $CO_2$, 0.4% of CO, and several highly reactive radicals such as OH, O, and H, was fed into the incoming regenerator flue gas stream inside the regenerator flue gas duct, causing some of the CO in the regenerator flue gas to convert to $CO_2$ and released heat. The calculated temperature of the final mixture of the FCC regenerator flue gas and the hot oxygen stream was 1475 F which was also the mixture temperature entering the CO boiler. The CO boiler needed additional 55.5 MMBtu/hr of refinery gas fired with 364 ft³/sec of air to complete the CO burnout and to reach the same 1771 F baseline flame temperature. Since a portion of the CO was burned by combining with the hot oxygen stream, the excess oxygen in the boiler flue was reduced to 1.5%. The total boiler thermal input including heat provided by the FCC regenerator flue, natural gas, and the refinery gas was 127.4 MMBtu/hr. The boiler generated 118,521 lb/hr of steam and the total flue gas mass flow exiting the boiler was 569,089 lb/hr. It should be noted that by using this invention, both the boiler steam generation and the boiler flue gas mass flow were reduced by 34.2% and 17.2% respectively from those of the baseline Case A, while the boiler flame temperature was kept constant at 1771 F.

Case C used the same FCC regenerator flue gas which contained 3.64% of CO. In Case C, a high momentum hot oxygen stream at a temperature of 2446 F obtained by reaction of 3.7 MMBtu/hr of natural gas and 59 ton/day of oxygen was fed at a higher flow rate. To maintain the boiler's flame temperature at 1771 F and its flue gas excess $O_2$ at 1.5%, an additional 46.9 MMBtu/hr of refinery gas and 306 ft³/sec of air were required. The CO boiler's total firing rate was 120.4 MMBtu/hr and the steam production was 112,037 lb/hr. The calculated reduction in steam production was 37.8% and there was a corresponding 19.2% reduction in flue gas mass flow rate.

In Case D, air-fired burners in the CO boiler were eliminated so that the device was used for heat recovery only, not for further combustion. A high momentum hot oxygen stream at a temperature of 2928 F and obtained by reaction of 9.2 MMBtu/hr of natural gas and 116 ton/day of oxygen was fed to the regenerator flue gas at a rate to provide 105% of the theoretical oxygen required to burn all CO in the regenerator flue gas to $CO_2$. The hot oxygen stream mixed with the FCC regenerator flue gas and reacted with its contained CO to form a final mixture at 1771 F and with 0.1% of excess $O_2$. The total boiler thermal input was 79.1 MMBtu/hr and the steam flow was 73,619 lb/hr. The calculated reduction in steam production was 59.1% and the flue gas mass flow rate was reduced by 30.9%.

TABLE 1

|  | Case A | Case B | Case C | Case D |
|---|---|---|---|---|
| Flow Rates: | | | | |
| FCC regenerator flue (lb/hr) | 465,000 | 465,000 | 465,000 | 465,000 |
| CO concentration in regenerator flue (% vol.) | 1.51 | 3.64 | 3.64 | 3.64 |
| Refinery gas (ft^3/hr @ 60 F.) | 160,000 | 53,928 | 45,504 | 0 |
| Natural gas flow (ft^3/sec @ 60 F.) | 0.00 | 0.53 | 1.00 | 2.51 |
| Air flow (ft^3/sec @ 60 F.) | 790 | 364 | 306 | 0 |
| O2 Required: | | | | |
| O2 required (ton/day) | 0 | 31 | 59 | 116 |
| Heat Inputs: | | | | |
| FCC regenerator flue (MMBtu/hr) | 28.7 | 69.9 | 69.9 | 69.9 |
| Refinery gas (MMBtu/hr) | 164.8 | 55.5 | 46.9 | 0.0 |
| Natural gas (MMBtu/hr) | 0.0 | 1.9 | 3.7 | 9.2 |
| Sum of heat inputs (MMBtu/hr) | 193.5 | 127.4 | 120.4 | 79.1 |
| CO Boiler: | | | | |
| Flame temperature (F.) | 1771 | 1771 | 1771 | 1771 |
| O2 to stack (%) | 3.0 | 1.5 | 1.5 | 0.1 |
| Steam flow (lb/hr) | 180,000 | 118,521 | 112,037 | 73,619 |
| Reduction of boiler steam flow (%) | baseline | −34.2 | −37.8 | −59.1 |
| Temperature of regenerator flue entering boiler (F.) | 1250 | 1475 | 1582 | 1771 |
| Total Flue Gas Flow from CO Boiler: | | | | |
| mass flow (lb/hr) | 687,136 | 569,089 | 555,272 | 475,078 |
| volume flow (ft^3/sec @ 60 F.) | 2,469 | 2,022 | 1,970 | 1,669 |
| Reduction of boiler flue gas mass flow (%) | baseline | −17.2 | −19.2 | −30.9 |
| Reduction of boiler flue gas volume flow (%) | baseline | −18.1 | −20.2 | −32.4 |

EXAMPLE 2

The CO and NOx reduction aspect of this invention is assessed and illustrated by using a computer model of detailed chemical kinetics. In this instance, the composition of the FCC regenerator flue was adjusted so that 500 ppmv of $NH_3$ and 500 ppmv of HCN were added and the concentration of the nitrogen as $N_2$ was reduced by 0.1% by volume so that the total amount of nitrogen entering in any form remained the same. The same three cases (Cases B, C, and D) as defined in Example 1 were used for model calculations and the calculated results are summarized in Table 2.

In Case B, 465,000 lb/hr of FCC regenerator flue gas containing 3.64% of CO at 1250 F entered a regenerator flue duct leading to a CO boiler. The total fixed nitrogen (TFN) contained in the regenerator flue gas was 221.3 lb/hr of which 110.65 lb/hr came from $NH_3$ and the other 110.65 lb/hr came from HCN. The total incoming mass flow rate of CO was 16,109 lb/hr. A high momentum hot oxygen stream which contained 82% of $O_2$, 11.5% of $H_2O$, 5.5% of $CO_2$, 0.4% of CO, and several highly reactive radicals such as OH, O, and H, at a temperature of 2446 F, obtained by reacting 1.9 MMBtu/hr of natural gas and 31 ton/day of oxygen, was fed into the regenerator flue gas duct through a lance. On combination of this hot oxygen stream with the incoming regenerator flue gas inside the regenerator flue duct, some of the CO and the $NH_3$ and HCN contained in the regenerator flue gas reacted with the hot oxygen according to a set of fundamental reaction mechanisms. It was assumed that entrainment and mixing of the regenerator flue gas with the hot oxygen stream took about 0.5 sec to complete. It was also assumed that the resulting mixture took another 0.5 sec to reach the CO boiler inlet. Further chemical reactions involving NOx and CO occurred during this time frame. The total fixed nitrogen flow at the exit of the regenerator flue gas duct (i.e., before entering the CO boiler) was calculated to be 85.5 lb/hr of which 70.75 lb/hr was from un-reacted HCN. The total un-burned CO was 7,382 lb/hr at the exit of the regenerator flue duct. Therefore, the oxygen injection reduced the FCC regenerator flue's total fixed nitrogen and CO contents by 61.4% and 54.2%, respectively. Due to the heat provided by the hot oxygen stream and from the partial burnout of the CO, the temperature of the regenerator flue gas was increased from 1250 F to 1475 F at the exit of the regenerator flue gas duct. The remaining 1.67% of CO in the FCC regenerator flue gas was burned by conventional air burners in the CO boiler as described in Example 1, Case B.

In Case C, the same FCC regenerator flue gas properties were assumed, hence the total fixed nitrogen and the CO contents in the regenerator flue gas were the same as those of Case B. A high momentum hot oxygen stream at a temperature of 2446 F and obtained by reacting 3.7 MMBtu/hr of natural gas and 59 ton/day of oxygen was fed into the regenerator flue gas in the duct. The calculated fixed nitrogen flow at the exit of the regenerator flue gas duct was 55.17 lb/hr representing a 75.1% reduction of fixed nitrogen mass flow. Likewise, the CO mass flow at the exit of the regenerator flue duct was 4,708 lb/hr which was a 70.8% reduction of CO mass flow. The CO concentration in the regenerator flue was reduced from 3.64% to 1.06% by volume at the exit of the regenerator flue duct. The temperature of the FCC regenerator flue gas at the CO boiler inlet increased to 1582 F because more CO was burned in the duct. The remaining 1.06% of CO in the regenerator flue gas was burned by conventional air burners in the CO boiler before exiting to the boiler stack.

Case D was also based on the same FCC regenerator flue gas properties as described in the previous two cases. In this case, a high momentum hot oxygen stream was set to contain 105% of the theoretical oxygen required for complete burnout of the CO in the FCC regenerator flue gas. To provide this stream, the calculated natural gas consumption rate was 9.2 MMBtu/hr and the calculated oxygen feed rate was 116 ton/day. The temperature of the hot oxygen stream was 2928 F. The total fixed nitrogen flow at the exit of the CO boiler duct was 25.19 lb/hr which represents 88.6% reduction of fixed nitrogen mass flow. The calculated CO mass flow at the exit of the regenerator flue gas duct was 148 lb/hr, representing a 99.1% reduction of CO mass flow. The CO concentration in the regenerator flue gas was reduced from 3.64% to 333 ppm by volume at the exit of the regenerator flue duct, where the temperature of the regenerator flue reached 1771 F.

This hot exhaust may go through a heat recovery device. When the hot flue gas is cooled down gradually in the heat recovery device, the CO concentration may reduce further since thermal equilibrium favors the formation of $CO_2$ in stead of $CO_2$ dissociation to form CO. Therefore, downstream air-fired burners normally installed for CO burnout were completely eliminated.

By comparing the components of the fixed nitrogen flows at the exit of the regenerator flue duct in Table 2, it also becomes clear that a gaseous environments at high temperature under sub-stoichiometric or near stoichiometric conditions are favored for efficient destruction of HCN. For example, there was 70.75 lb/hr of N from un-reacted HCN at 1475 F (Case B) and the N from un-reacted HCN was reduced to 0.60 lb/hr when the gas temperature was higher at 1771 F (Case D). This finding suggests that this invention, as illustrated in this example, can be tailored to provide maximum destruction of fixed nitrogen depending on the composition of the fixed nitrogen flows in the FCC regenerator flue. For example, if the incoming FCC regenerator flue were to contain high concentrations of HCN but little $NH_3$, then the amount of oxygen injection in the regenerator flue duct would be increased so that more CO burns but still under sub-stoichiometric conditions. The higher CO burnout should increase the gas temperature which in turn promotes the destruction of HCN to $N_2$ in the regenerator flue gas duct.

TABLE 2

|  | Case B | Case C | Case D |
| --- | --- | --- | --- |
| Flow Rate of FCC Regenerator Flue (lb/hr) | 465,000 | 465,000 | 465,000 |
| Regenerator Flue Temperature (F.) | 1250 | 1250 | 1250 |
| CO Concentration in Regenerator Flue (%, vol.) | 3.64 | 3.64 | 3.64 |
| Incoming Fixed Nitrogen in Regenerator Flue: | | | |
| From $NH_3$ (lb/hr) | 110.65 | 110.65 | 110.65 |
| From HCN (lb/hr) | 110.65 | 110.65 | 110.65 |
| Total Fixed Nitrogen, TFN (lb/hr) | 221.30 | 221.30 | 221.30 |
| Incoming CO in Regenerator Flue (lb/hr): | 16109 | 16109 | 16109 |
| Natural Gas Used by HiMOL (MMBtu/hr) | 1.9 | 3.7 | 9.2 |
| O2 Used by HiMOL (ton/day) | 31 | 59 | 116 |
| Temperature of HiMOL Exhaust (F.) | 2446 | 2446 | 2928 |
| Mixing time of Reg. Flue and HiMOL Effluent (sec) | 0.5 | 0.5 | 0.5 |
| Additional Gas Residence Time after Mixing (sec) | 0.5 | 0.5 | 0.5 |
| Total Gas Residence Time in Reg. Flue Duct (sec) | 1.0 | 1.0 | 1.0 |
| Fixed Nitrogen @ Exit of Reg. Flue Duct: | | | |
| From NO (lb/hr) | 4.52 | 7.80 | 23.84 |
| From $NO_2$ (lb/hr) | 0.00 | 0.00 | 0.00 |
| From $N_2O$ (lb/hr) | 3.87 | 1.77 | 0.73 |

TABLE 2-continued

|                                              | Case B    | Case C    | Case D   |
|----------------------------------------------|-----------|-----------|----------|
| From $NH_3$ (lb/hr)                          | 6.36      | 1.69      | 0.02     |
| From HCN (lb/hr)                             | 70.75     | 43.91     | 0.60     |
| Total Fixed Nitrogen, TFN (lb/hr)            | 85.50     | 55.17     | 25.19    |
| Reduction of Total Fixed Nitrogen (%, mass)  | 61.4      | 75.1      | 88.6     |
| CO Mass Flow @ Exit of Reg. Flue Duct (lb/hr): | 7382    | 4708      | 148      |
| CO Concentration @ Exit of Reg. Flue Duct    | 1.67% vol.| 1.06% vol.| 333 ppmv |
| Reduction of CO (%, mass)                    | 54.2      | 70.8      | 99.1     |
| Gas Temperature @ Exit of Reg. Flue Duct (F.)| 1475      | 1582      | 1771     |

(Note: The device that partially combusted oxygen with fuel to produce the hot oxidant stream which was fed to the regenerator flue gas stream is referred to in the Table as a "HiMOL".)

What is claimed is:

1. A method for treating a regenerator flue gas stream comprising
   (A) providing from a catalyst regenerator a regenerator flue gas stream that contains NOx and carbon monoxide;
   (B) mixing fuel and oxygen and combusting a portion of the oxygen in the mixture with said fuel to form a hot oxidant stream that has a temperature of at least 2000 F and that contains oxygen and products of said combustion;
   (C) feeding the hot oxidant stream at a velocity of at least 500 feet per second into the regenerator flue gas stream to form a mixture having a temperature higher than 1250 F sufficient to convert carbon monoxide in the mixture to carbon dioxide and to convert NOx in the mixture to $N_2$ thereby producing a product stream wherein the amount of NOx in the product stream following said conversion is less than the amount of NOx in said regenerator flue gas stream before said mixture is formed.

2. A method according to claim 1 wherein the mixture that is formed in step (C) of the hot oxidant stream and the regenerator flue gas has a temperature of at least 1400 F.

3. A method according to claim 1 wherein the mixture that is formed in step (C) of the hot oxidant stream and the regenerator flue gas has a temperature of at least 1600 F.

4. A method according to claim 1 wherein the regenerator flue gas provided in step (A) contains at least 1 vol. % carbon monoxide.

5. A method according to claim 1 wherein no more than 20% of the oxygen mixed with fuel in step (B) is combusted in step (B).

6. A method according to claim 1 wherein the hot oxidant stream formed in step (B) is fed into the regenerator flue gas stream in step (C) at a velocity of 500 to 3000 feet per second.

7. A method according to claim 1 wherein the regenerator flue gas stream is passed through a power recovery turbine before the hot oxidant stream is fed into it in step (C).

8. A method according to claim 1 wherein the product stream produced in step (C) is passed through a power recovery turbine.

9. A method for treating a regenerator flue gas stream comprising
   (A) providing from a catalyst regenerator a regenerator flue gas stream that contains NOx and carbon monoxide;
   (B) mixing fuel and oxygen and combusting a portion of the oxygen in the mixture with said fuel to form a first hot oxidant stream that has a temperature of at least 2000 F and that contains oxygen and products of said combustion;
   (C) feeding the first hot oxidant stream into the regenerator flue gas stream to form a first mixture having a temperature higher than 1250 F sufficient to convert carbon monoxide in the mixture to carbon dioxide and to convert NOx in the mixture to $N_2$, thereby producing a stream comprising carbon monoxide, carbon dioxide, NOx and $N_2$;
   (D) mixing fuel and oxygen and combusting a portion of the oxygen in the mixture with said fuel to form a second hot oxidant stream that has a temperature of at least 2000 F and that contains oxygen and products of said combustion;
   (E) feeding the second hot oxidant stream into the stream produced in step (C) to form a second mixture having a temperature higher than 1250 F sufficient to convert carbon monoxide in the second mixture to carbon dioxide and to convert NOx in the second mixture to $N_2$ thereby producing a product stream wherein the amount of NOx in the product stream following said conversion is less than the amount of NOx in said regenerator flue gas stream before said first mixture was formed.

10. A method according to claim 9 wherein the first mixture formed in step (C), the second mixture formed in step (E), or both said mixtures, has a temperature of at least 1400 F.

11. A method according to claim 9 wherein the first mixture formed in step (C), the second mixture formed in step (E), or both said mixtures, has a temperature of at least 1600 F.

12. A method according to claim 9 wherein the regenerator flue gas provided in step (A) contains at least 1 vol. % carbon monoxide.

13. A method according to claim 9 wherein no more than 20% of the oxygen mixed with fuel in step (B) is combusted in step (B).

14. A method according to claim 9 wherein no more than 20% of the oxygen mixed with fuel in step (D) is combusted in step (D).

15. A method according to claim 9 wherein the hot oxidant stream formed in step (B) is fed into the regenerator flue gas stream in step (C) at a velocity of at least 500 feet per second.

16. A method according to claim 15 wherein the hot oxidant stream formed in step (D) is fed into the stream produced in step (C) at a velocity of at least 500 feet per second.

17. A method according to claim 9 wherein the hot oxidant stream formed in step (D) is fed into the stream produced in step (C) at a velocity of at least 500 feet per second.

18. A method according to claim 9 wherein the hot oxidant stream formed in step (B) is fed into the regenerator flue gas stream in step (C) at a velocity of 500 to 3000 feet per second.

19. A method according to claim 18 wherein the hot oxidant stream formed in step (D) is fed into the stream produced in step (C) at a velocity of 500 to 3000 feet per second.

20. A method according to claim 9 wherein the hot oxidant stream formed in step (D) is fed into the stream produced in step (C) at a velocity of 500 to 3000 feet per second.

21. A method according to claim 9 wherein the regenerator flue gas stream is passed through a power recovery turbine before the hot oxidant stream is fed into it in step (C).

22. A method according to claim 9 wherein the stream produced in step (C) is passed through a power recovery turbine before the second hot oxidant stream is fed into it in step (E).

23. A method according to claim 9 wherein the product stream produced in step (L) is passed through a power recovery turbine.

24. A method for treating a regenerator flue gas stream comprising
(A) providing from a catalyst regenerator a regenerator flue gas stream that contains no NOx and contains carbon monoxide and one or both of $NH_3$ and HCN;
(B) mixing fuel and oxygen and combusting a portion of the oxygen in the mixture with said fuel to form a hot oxidant stream that has a temperature of at least 2000 F and that contains oxygen and products of said combustion;
(C) feeding the hot oxidant stream at a velocity of at least 500 feet per second into the regenerator flue gas stream to form a mixture having a temperature higher than 1250 F sufficient to convert carbon monoxide in the mixture to carbon dioxide and to convert one or both of $NH_3$ and HCN in the mixture to $N_2$.

25. A method according to claim 24 wherein the mixture that is formed in step (C) of the hot oxidant stream and the regenerator flue gas has a temperature of at least 1400 F.

26. A method according to claim 24 wherein the mixture that is formed in step (C) of the hot oxidant stream and the regenerator flue gas has a temperature of at least 1600 F.

27. A method according to claim 24 wherein the regenerator flue gas provided in step (A) contains at least 1 vol. % carbon monoxide.

28. A method according to claim 24 wherein no more than 20% of the oxygen mixed with fuel in step (B) is combusted in step (B).

29. A method according to claim 24 wherein the hot oxidant stream formed in step (B) is fed into the regenerator flue gas stream in step (C) at a velocity of 500 to 3000 feet per second.

30. A method according to claim 24 wherein the regenerator flue gas stream is passed through a power recovery turbine before the hot oxidant stream is fed into it in step (C).

31. A method according to claim 24 wherein the product stream produced in step (C) is passed through a power recovery turbine.

32. A method for treating a regenerator flue gas stream comprising
(A) providing from a catalyst regenerator a regenerator flue gas stream that contains no NOx and contains carbon monoxide and one or both of $NH_3$ and HCN;
(B) mixing fuel and oxygen and combusting a portion of the oxygen in the mixture with said fuel to form a first hot oxidant stream that has a temperature of at least 2000 F and that contains oxygen and products of said combustion;
(C) feeding the first hot oxidant stream into the regenerator flue gas stream to form a first mixture having a temperature higher than 1250 F sufficient to convert carbon monoxide in the mixture to carbon dioxide and to convert NOx in the mixture to $N_2$, thereby producing a stream comprising carbon monoxide, carbon dioxide, and $N_2$;
(D) mixing fuel and oxygen and combusting a portion of the oxygen in the mixture with said fuel to form a second hot oxidant stream that has a temperature of at least 2000 F and that contains oxygen and products of said combustion;
(E) feeding the second hot oxidant stream into the stream produced in step (C) to form a second mixture having a temperature higher than 1250 F sufficient to convert carbon monoxide in the second mixture to carbon dioxide and to convert $NH_3$ and HCN present in the second mixture to $N_2$.

33. A method according to claim 32 wherein the first mixture formed in step (C), the second mixture formed in step (E), or both said mixtures, has a temperature of at least 1400 F.

34. A method according to claim 32 wherein the first mixture formed in step (C), the second mixture formed in step (E), or both said mixtures, has a temperature of at least 1600 F.

35. A method according to claim 32 wherein the regenerator flue gas provided in step (A) contains at least 1 vol. % carbon monoxide.

36. A method according to claim 32 wherein no more than 20% of the oxygen mixed with fuel in step (B) is combusted in step (B).

37. A method according to claim 32 wherein no more than 20% of the oxygen mixed with fuel in step (D) is combusted in step (D).

38. A method according to claim 32 wherein the hot oxidant stream formed in step (B) is fed into the regenerator flue gas stream in step (C) at a velocity of at least 500 feet per second.

39. A method according to claim 38 wherein the hot oxidant stream formed in step (D) is fed into the stream produced in step (C) at a velocity of at least 500 feet per second.

40. A method according to claim 32 wherein the hot oxidant stream formed in step (D) is fed into the stream produced in step (C) at a velocity of at least 500 feet per second.

41. A method according to claim 32 wherein the hot oxidant stream formed in step (B) is fed into the regenerator flue gas stream in step (C) at a velocity of 500 to 3000 feet per second.

42. A method according to claim 41 wherein the hot oxidant stream formed in step (D) is fed into the stream produced in step (C) at a velocity of 500 to 3000 feet per second.

43. A method according to claim 32 wherein the hot oxidant stream formed in step (D) is fed into the stream produced in step (C) at a velocity of 500 to 3000 feet per second.

44. A method according to claim 32 wherein the regenerator flue gas stream is passed through a power recovery turbine before the hot oxidant stream is fed into it in step (C).

45. A method according to claim 32 wherein the stream produced in step (C) is passed through a power recovery turbine before the second hot oxidant stream is fed into it in step (E).

46. A method according to claim 32 wherein the product stream produced in step (E) is passed through a power recovery turbine.

* * * * *